April 14, 1964
A. J. CHRISTOPHER
3,128,982
TRIPOD HEAD
Filed Dec. 4, 1962
2 Sheets-Sheet 1
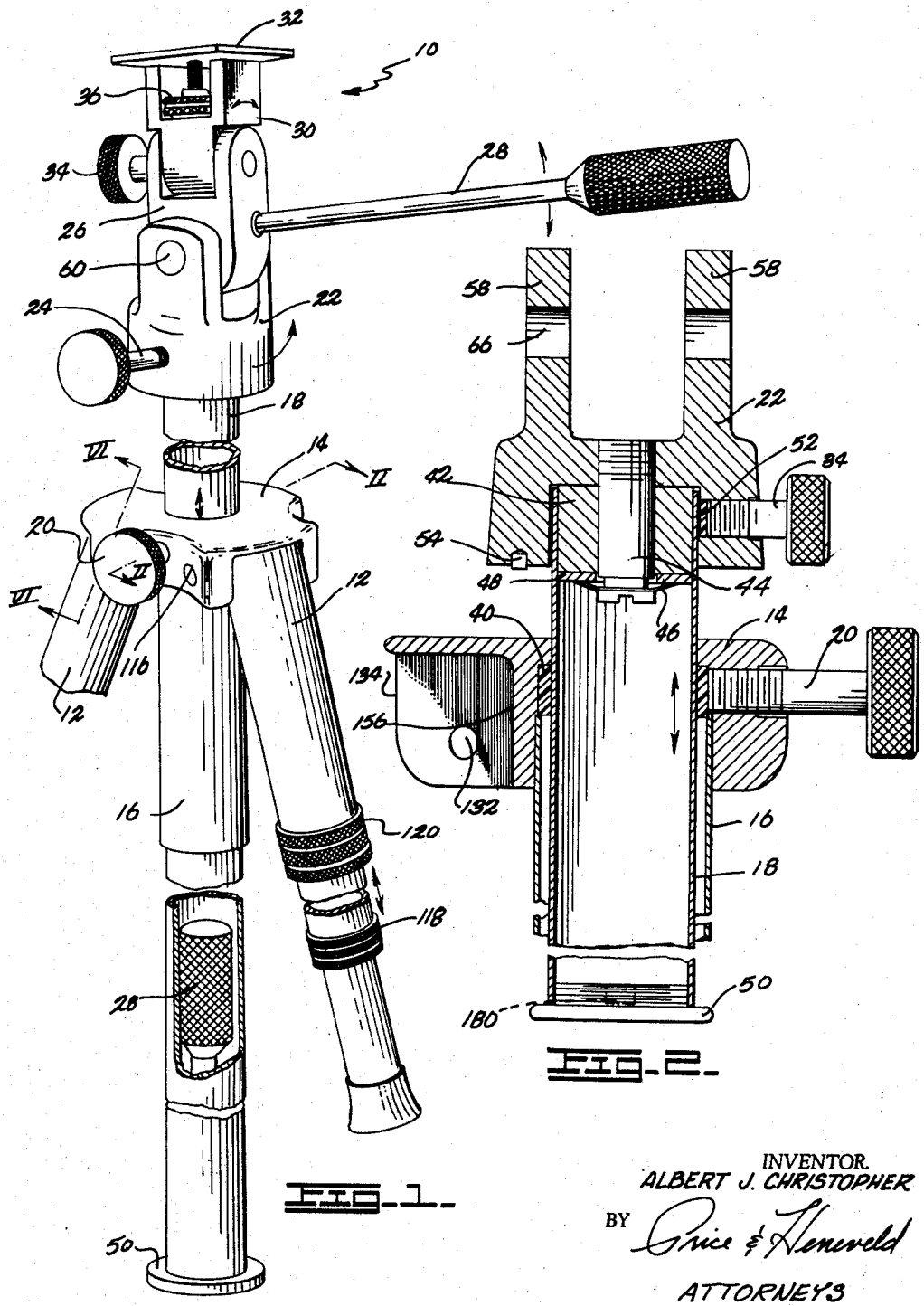
INVENTOR.
ALBERT J. CHRISTOPHER
BY Price & Heneveld
ATTORNEYS April 14, 1964  A. J. CHRISTOPHER  3,128,982
TRIPOD HEAD
Filed Dec. 4, 1962  2 Sheets-Sheet 2
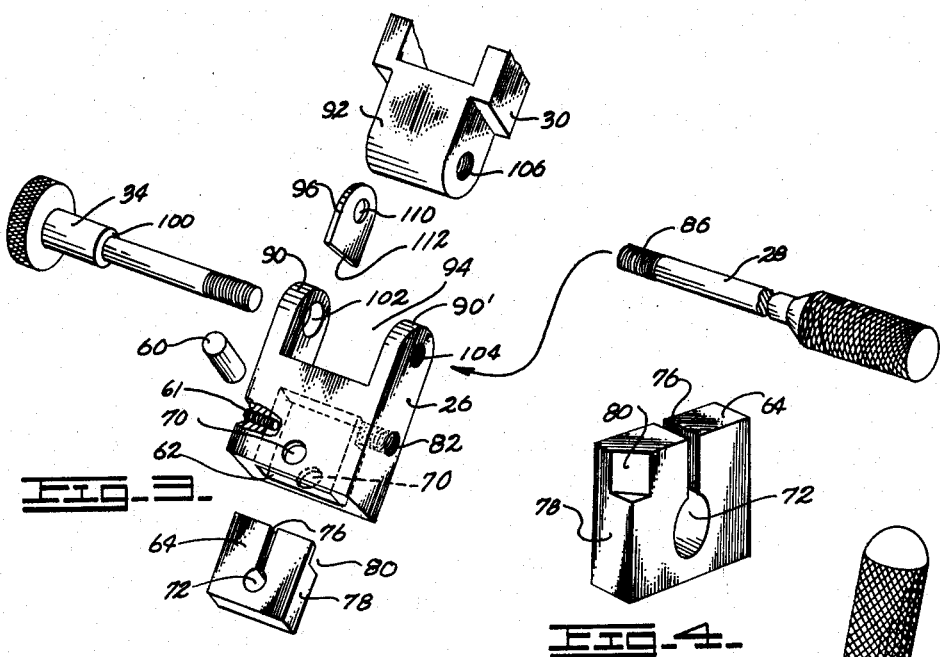
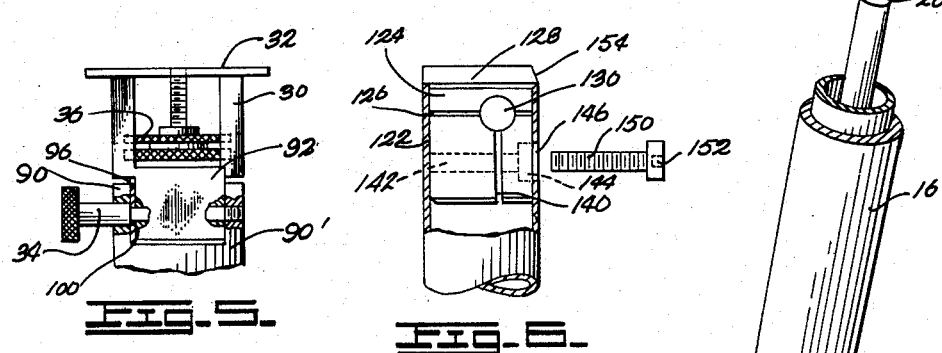
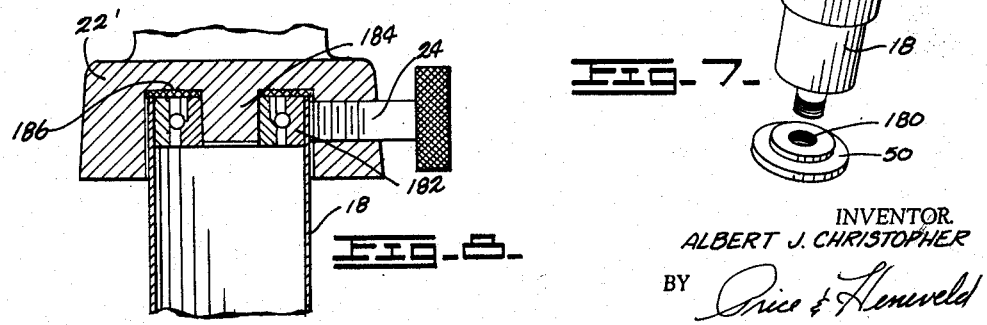
INVENTOR.
ALBERT J. CHRISTOPHER
BY Price & Heneveld
ATTORNEYS

United States Patent Office 3,128,982
Patented Apr. 14, 1964

3,128,982
TRIPOD HEAD
Albert J. Christopher, Muskegon, Mich., assignor to Alkirk Inc., Muskegon, Mich., a corporation of Michigan
Filed Dec. 4, 1962, Ser. No. 242,208
8 Claims. (Cl. 248—183)

This invention relates to a camera tripod support and more particularly to a tripod support having both optimum versatility and optimum stability.

Various types of camera tripod structures are available today. Those including panoramic movement in a horizontal plane often involve a complex expensive bearing structure. Further, these bearings often have considerable "slop" or "play" in dimensions other than the horizontal movement plane, to thereby often cause poor quality photography. Others have panoramic movement in a vertical plane over a wide angle range. However, those known do not lock tightly enough at any particular angle in the plane, thereby allowing the camera to move with any slight jar of the tripod. Some tripod supports also have a tiltable camera bed. Here again, when the camera is mounted on the bed and it is tilted off to one side, for example, so that the weight of the entire camera tends to swivel the bed on its hinge mount, the bed is not completely stable and rigid against movement if any part of the tripod is jarred.

The inventor herein has devised a novel tripod having none of these defects, and further providing many other advances.

It is therefore the principle object of this invention to provide a camera support tripod which has complete versatility to effect panoramic sweep in a horizontal plane, panoramic sweep in a vertical plane, and camera bed tilt all in the same structure, and yet with smooth, dependable, exact operation of each independent of the others. There is no sloppiness or play between any of the components, only the intended movement in the dimension or plane of movement. Any of the three variations mentioned above can be effected while the other two remain the same, or all three mechanisms can be rigidly locked to prevent any movement whatever. Each provides a positive locking mechanism which is readily released to allow desired movement.

It is another object of this invention to provide a unique horizontal panoramic sweep bearing support which is extremely simple in construction, and is adjustable in tension to provide smooth operation in the horizontal plane without any play in other dimensions. The bearing is completely hidden from normal view.

It is another object of this invention to provide a unique locking mechanism for the panoramic movement in a vertical plane so that even if the camera weight is off to one side and has a tendency to cause the vertical locking means to move slightly, this does not occur due to a novel binding action between the components.

It is another object of this invention to provide a structure whose components interfit to effect a simplified, neat, clean design where not only the horizontal panoramic bearing support is hidden from view, but also the leg mounting connections between each leg and the main support bracket are hidden. Moreover, each leg mounting bracket provides variable tension on the pivotal mounting support.

It is still another object of this invention to provide a tiltable camera bed having a novel locking means easily assembled and operated, and effectively preventing movement of the camera bed when the locking means is tightened.

It is another object of this invention to provide a tripod structure which, when collapsed for portability, provides a unique, hidden retention of the elongated vertical panoramic control handle.

These and other objects of this invention will be apparent upon studying the following specification in conjunction with the drawings in which:

FIG. 1 is an elevational view of the tripod;

FIG. 2 is a fragmentary, sectional elevational view of the main support bracket, center post, and horizontal panoramic bracket taken on plane II—II of FIG. 1;

FIG. 3 is an exploded fragmentary view of the vertical panoramic bracket and handle assembly;

FIG. 4 is a perspective view of the swivel block in the assembly of FIG. 3;

FIG. 5 is a fragmentary, partially sectioned, elevational view of the lockable tilt connection means between the vertical panoramic bracket and the tiltable camera bed bracket;

FIG. 6 is a sectional fragmentary view of the connecting means between each leg and the main support bracket taken on plane VI—VI of FIG. 1;

FIG. 7 is a fragmentary perspective view showing the storage of the vertical panoramic control handle in the lower end of the center post; and FIG. 8 is a fragmentary sectional view of a modified and less preferred form of the horizontal panoramic bracket connection to the top of the center post.

Referring now specifically to the drawings, the compact versatile stable tripod 10 comprises three telescopically adjustable legs 12, each pivotally mounted at its upper end to a main support bracket 14, which has a central, fixed, tubular guide 16 housing a vertically adjustable center post 18. This post is lockable by center post lock knob 20 between main support bracket 14 and post 18. Rotatably mounted to the upper end of center post 18 is a horizontal panoramic bracket 22 adapted to revolve in a horizontal plane when released by lock knob 24 between bracket 22 and center post 18. Pivotally mounted at the upper end of horizontal panoramic bracket 22 is a vertical panoramic bracket 26 adapted to rotate about its pivotal axis over a wide angle in a vertical plane as controlled by an elongated control handle and locking means 28. Tiltably mounted to the upper end of the vertical panoramic bracket is a camera bed bracket 30 for the bed 32 which includes a conventional camera fastener 36. Tilting of the bed is controlled by a bed lock knob 34.

*Adjustable Tension Horizontal Panoramic Bearing Support*

Referring especially to FIGS. 1 and 2, the center post is a tubular element which fits through a central opening in the main support bracket 14 and is guided within a fixed cylindrical sleeve or tube 16. The center post 18 is releasable for vertical adjustment movement by loosening of threaded lock stud 24 by its knob. This withdraws the stud from locking ring 40 of flexible material such as plastic to allow center post 18 to be vertically adjusted to a desired position. The connection between the bracket 22 and the center post for horizontal panoramic movement is by means of a special bearing. It includes an annular bearing sleeve 42. This sleeve is tightly fitted into the hollow upper end of the center post tube 18 and receives a central depending post 44 which threadably engages bracket 22 at its upper end. Between the lower head of the threaded post or stud 44 and the bottom of the bushing 42 is a dished-spring retaining ring 46 and a washer 48. After these elements are assembled, all play or slop in other than the horizontal direction can be readily taken out of the bearing connection by unscrewing the lower end cap 50, inserting a long screw driver into engagement with stud 44, and adjusting the tension of the springlike retaining ring 46 and thus the entire assembly. Yet, the connection provides smooth sweep movement. Locking knob 24 by its threaded engagement with bracket 22 presses against a disc 52 of suitable material such as nylon or Teflon against the center post 18, so that with loosening of horizontal panoramic locking knob 24 the entire structure above the center post may be rotataed 360° for sweeping in a horizontal plane. When the knob is locked, the unit is rigid. In order to prevent bracket 22 from scoring the main support bracket 14 when the center post 18 is completely lowered, and to provide smooth sweep action even then, a small, protruding, lubricious plastic bearing insert 54 is press fitted into a receiving orifice in the bottom of bracket 22 to contact the upper surface of the main bracket.

Extending upwardly from bracket 22 is a pair of rigid parallel mounting ears 58 adapted to receive vertical panoramic sweep bracket 26.

Locking Assembly for Vertical Panoramic Bracket

The vertical panoramic bracket 26 is mounted into the space between the ears 58 of the horizontal panoramic bracket 22 by a cylindrical, horizontally extending pin 60. In the bottom end and extending upwardly into the central interior of bracket 26 is a cavity 62 adapted to receive a swivel block 64. The pin 60 pivotally mounting these two brackets together extends through the opening 66 in the ears 58 of bracket 22, through the openings 70 in the walls on opposite sides of cavity 62 in bracket 26, and through the cylindrical opening 72 through the sides of swivel block 64. Extending vertically upwardly from the length of cylindrical opening 72 in swivel block 64 is a through-slot 76 which splits the upper end of the block into two sides.

On one lateral edge 78 of this swivel block, parallel to either wall of slot 76, is a beveled surface 80, formed by milling off one corner of the edge, so that the beveled surface is at an acute angle of about 20° with respect to edge surface 78. Projecting in a generally horizontal plane into bracket 26, and more specifically into a threaded opening 82 extending into cavity 62, is an elongated control and locking handle 28 threaded at its inner end to be engageable with opening 82. The opening 82 and handle 28 are perpendicular to beveled surface 78. The innermost end 86 of this handle directly engages the beveled surface 80. It has been found that with this novel structure, when handle 28 is twisted to tighten it against surface 80, the binding effect which occurs on block 64 in cavity 62 and around cylindrical pin 60 not only radially compresses the split block on the pin, but also causes axial binding of the block on the pin and in cavity 62. The resulting frictional locking properties are surprisingly large. Even when a heavy camera is mounted on the bed of the tripod and is positioned way off to one side, where ordinarily a slight jarring would cause slippage movement of the bed and camera, they still remain completely rigid to enable the photographer to obtain high quality work.

The elongated nature of the handle 28 also enables the photographer to twist the handle to loosen this binding connection and still have optimum control over the vertical sweep action of the camera over about 150°.

On the opposite side of the swivel block from handle 28 is a snugging set screw 61 which is threadably engaged through the end of bracket 26 into end engagement with block 64. This serves to give an adjustable binding effect between the block and its cavity. Thus, when handle 28 is loosened a minimum, frictional engagement of block 64 and bracket 26 on pin 60 still exists to prevent sloppiness of the fit.

Tilting Camera Bed Lock

In order to provide stability and rigidity to this structure, the components, including the pair of mounting ears 90 which are integral with and extend upwardly from bracket 26 are relatively thick and very rigid. These receive the relatively wide leg 92 of camera bed bracket 30 which supports the platform 32. A novel rotational locking means is utilized to anchor or lock the tiltable bed bracket in any position around it 180° movement, i.e. even at 90° in either direction from vertical. In order to provide this locking effect, leg 92 is machined to have a width somewhat smaller than space 94 between ears 90, so that a clearance remains therebetween when engaged. In this clearance is placed a special locking shim or spacer 96. Pivotally connecting the components together is a thread lock knob 34 which comprises a threaded stud with a knurled knob and a special shoulder portion 100. One of the ears 90 is provided with a relatively large opening 102 to receive the larger diameter portion of locking knob 34, while the other ear 90′ is provided with a smaller threaded opening 104 to receive the threaded end of knob 34. Elongated opening 106 through leg 92 is substantially the same size as opening 104 but is not threaded.

When assembled as in FIG. 5, therefore, the threaded end of stud 34 engages threaded opening 104 in ear 90′, the smaller diameter portion of stud 34 fits through opening 110 in spacer 96 and opening 106 in leg 92, and the special shoulder 100 engages the novel spacer 96. Spacer 96 has a flat edge portion 112 which engages with the bottom of slot 94, i.e. with bracket 22 to prevent rotation of the spacer at any time with respect to the bracket. When knob 34 is loosened, bracket 30 and the camera mounted on bed 32 may be tilted within 90° to either side to the desired position. Then knob 34 is tightened to cause shoulder 100 to bear tightly against spacer 96, which binds against leg 92 and ear 90′. The tight frictional engagement between spacer 96 and leg 92 locks the two together and imparts the nonrotational characteristics of the spacer to the leg, so that even with a heavy camera mounted on platform 32, and the camera tilted 90° to one side, the structure still remains rigid and does not allow the camera to move.

Enclosed Leg Bracket Mounting Assembly

As stated previously, each of the legs 12 is pivotally mounted to main bracket 14 by connections using a cylindrical support pin 116. Each of the legs has conventional telescoping fittings 118 and 120 and is basically composed of a series of telescopically adjustable tubular sleeves including the uppermost sleeve 122 (FIG. 6). Into the upper end of each of the three hollow sleeves 122 is press fitted a mounting plug 124 which has suitable circumferential grooves 126 to receive deformed metal of the tube when press fitted for stability. Plug 124 includes a collar 128 which extends above the tube 122 and has a diameter slightly greater than the rest of the plug to limit the insertion of the plug in the tube. A pin 116 fits in a transverse, cylindrical, pin-receiving socket 130 which extends through plug 124 and through both walls of the leg sleeve on opposite sides of the plug. Its ends fit into openings 132 (FIG. 2) in the main support bracket flanges 134 on each side of each leg. Extending vertically downwardly from the length of cylindrical socket 130 in plug 124 is a through-slot 140 which splits the lower end of the plug into two parts. Transversely of this slot is a threaded, stud-receiving socket 142 having an enlarged portion 144 adjacent a corresponding opening 146 in the wall of leg sleeve 122, so that a suitable threaded bolt 150 having an Allen wrench fitting 152 in its head can be inserted therein.

By tightening bolt 150, the compression of the split plug on pin 116, and thus the tautness in the pivotal connection of the leg with respect to the main support bracket is controlled. It will be noted that on one edge of collar 128 of plug 124 is a flat 154 milled to fit against surface 156 between the flanges 134 (FIG. 2) of the main support bracket when the leg is arcuately extended as in FIG. 1. This provides accuracy of fit when equipment is set up.

It will be noted that the complete leg connection assembly is completely hidden from view and compact in structure, even though pivotal and adjustable.

*Center Post Assembly With Control Handle Retention*

Referring to FIGS. 1 and 2 and 7, it will be noted that the lower end of the center post 18 includes a threadably engaged cap 50 which can be removed. When this is removed and knob 24 is loosened, the entire center post assembly with all the brackets mounted thereon lifted out of the main bracket, inverted, and inserted into the bottom of sleeve 16 so that the camera on the support bed 32 is upside down. This enables the photographer to obtain low angle shots with a minimum of ease. The bearing connections and swivel joint locks are all so rigid that even when mounted in this inverted position, there is no play in the connections in other than the directions desired when appropriate control handle knobs are loosened.

The lower end cap 50 also combines with the hollow center post 18 to serve another useful purpose. As indicated above, the length of the vertical panoramic control handle 28 is quite substantial to provide proper leverage for control when sweep moving the camera in a vertical plane. When, however, the structure is compacted by shortening up the telescopically adjustable legs and swiveling them arcuately inwardly towards and into contact with each other, and then shortening the center post down to its lowermost position, the handle 28 still protrudes a substantial distance away from the assembly. With the novel structure, it will be noted that in the cap 50 is provided a central threaded socket 180 to match the threads on the end of handle 28. When the structure is completely collapsed, the handle 28 is removed from bracket 26, cap 50 is unscrewed, handle 28 is screwed into socket 180, and the cap is replaced by inserting the handle directly up inside the hollow sleeve of the center post 18 as in FIG. 7. Thus, the entire structure is completely and compactly stored with no obtrusive parts. The cap 50 is coated with a resilient material such as a vinyl plastisol.

*Modified Horizontal Support Bearing*

Referring to FIG. 8, a less preferred form of bearing between the horizontal panoramic bracket 22' and the center support post 18 is there shown. In this form of the bearing, the outer race 182 of the bearing is press fitted inside sleeve 18, while the inner race is press fitted around the integral depending post 184 of bracket 22'. Between the bearing and the bracket, and lying in a horizontal plane on top of the bearing is a washer 186, for example, of felt.

This entire structure is compact, simple to manufacture, and yet provides all of the advantages of presently available structures with their complexity and space consumption. As before, a tightening stud 24 is threadably engaged in a socket in the bracket 22' to bear against sleeve 18 and lock the assembly against movement, or alternatively allow the assembly to be rotatably moved in a panoramic sweep fashion in a horizontal plane.

Those in this field and studying the several advantageous and inventive features of this tripod structure may well see advantages not specifically mentioned above. Also, certain obvious modifications will perhaps occur within the principles of the invention as taught. These obvious modifications are deemed to be part of this invention which is to be limited only by the scope of the appended claims and reasonably equivalent structures to those defined therein.

I claim:

1. A camera-supporting tripod comprising, leg means attached to a main support bracket; a center post normally held locked to said bracket; a camera support bed; horizontal panoramic sweep means between said post and bed; said sweep means comprising a sweep bracket rotatably mounted on a bearing inside the upper end of said center post; said bearing including an annular bushing snugly held against the inner periphery of the center post; a central post depending from said sweep bracket and snugly fitting inside said bushing; and releasable lock means between said sweep bracket and post.

2. A camera-supporting tripod comprising, leg means attached to a main support bracket; a center post normally held fixed to said bracket; a camera support bed; horizontal panoramic sweep means between said post and bed; said sweep means comprising a sweep bracket rotatably mounted on a bearing inside the upper end of said center post; said bearing including an annular bushing snugly held against the inner center post periphery; a central threaded stud extending through said bushing and engaging said bracket; and resilient binding means between the head of said stud and said bushing to vary the ease of movement between the components of the connection and remove all unwanted play therefrom.

3. A camera-supporting tripod comprising, leg means attached to a main support bracket; a camera bed; vertical panoramic sweep means between said bracket and bed; said sweep means including a sweep bracket having a vertically-extending cavity and a horizontal, cylindrical pin-receiving socket thereacross receiving a support pin; a swivel block in said cavity having a cylindrical socket also receiving said pin, and a vertically extending slot between said block socket and a vertical block edge; one lateral edge of said block being beveled along a vertical plane; and a sweep handle threadably engaged with said sweep bracket with its inner end directly abutting said beveled surface, whereby tightening of said handle axially and radially binds said block, pin, and bracket into a tightly-interlocked engagement.

4. A camera-supporting tripod comprising, leg means attached to a main support bracket; a center post normally locked to said bracket; horizontal sweep means rotatably mounted on said center post, and supporting a horizontal cylindrical pin thereabove; a camera support bed; and vertical panoramic sweep means between said horizontal sweep means and said bed, and including a sweep bracket having a bottom cavity receiving a swivel block; said bracket and block having aligned cylindrical socket means receiving said pin to provide sweep in a vertical plane; said block being split from its socket to a vertical edge; a lateral edge of said block being beveled on a vertical plane at a small acute angle to the lateral edge; a sweep control handle threadably engaged with said bracket at said same small acute angle with respect to the bracket and having its inner end directly abutting the beveled block edge, whereby tightening of said handle axially and radially binds said block, pin, and bracket into tightly interlocked engagement.

5. A camera tripod leg with hidden connection means, comprising an elongated element hollow at least at the upper end; a plug held tightly engaged inside said hollow upper end and having a transverse cylindrical pin-receiving socket to interfit with a fixed support pin in a pivotal manner allowing angular collapsing of the leg; a through-slot extending downwardly from said socket; a threaded, stud-receiving socket transverse to said slot; an opening in the wall of said leg aligned with said threaded socket; and a bolt in said threaded socket and adjacent said opening to tighten the lower end of said plug onto said pin with optimum compression.

6. A camera tripod comprising, camera support means including a main support bracket and three legs mounted to said bracket; each of said legs being hollow at at least the upper end; a mounting plug interfitted in said hollow end and having a protruding collar; said collar adapted to abut said bracket when said legs are arcuately extended, to serve as a stop means; a cylindrical pin-receiving socket extending across said plug and out the walls of said hollow leg portion and secured at its ends to said bracket; a through-slot extending from said socket to the lower end of said plug to provide radial contractibility; a threaded socket in said plug transverse to said slot and aligned with an opening in the wall of said hollow portion; and a bolt fitted through said opening and engaged in said threaded socket to provide variable tightening to said plug on said pin.

7. A camera supporting tripod comprising, leg means attached to bracket means; a camera bed; and a tiltable connection between said bed and bracket means including a pair of rigid, spaced ears on said bracket means receiving a bracket leg on said bed therebetween; aligned transverse openings in said ears and leg; the dimension between said ears being greater than the dimension of said leg to provide a clearance therebetween; a locking spacer element in said clearance having an orifice aligned with said openings, and having edge portions engaging said bracket means to prevent rotation of the element; locking stud means extending through said openings and orifice with one end engaged in said threaded opening; said leg being pivotal on said stud to provide a tilting camera bed; and said stud means including a shoulder adapted to engage and bind said spacer, leg, and one of said ears into a tightly locked non-rotational engagement when said stud is tightened.

8. A camera tripod having independent horizontal panoramic sweep means, vertical panoramic sweep means, and a tilting camera bed, comprising: three legs pivotally mounted to a main support bracket; a center post normally held locked to said bracket; a horizontal panoramic sweep bracket rotatably mounted on a bearing inside said center post; said bearing including an annular bushing snugly held against the inner peripheral wall of said center post; a central threaded stud extending through said bushing and threadably engaging said bracket; resilient binding means between the head of said stud and said bushing to allow variable tightening whereby all play can be removed from the rotatably connection; said horizontal sweep bracket including a pair of upwardly extending ears supporting a cylindrical pin therebetween; a vertical panoramic sweep bracket pivotally mounted on said pin, and including a cavity extending upwardly from the bottom; a swivel block in said cavity; said bracket and block having aligned cylindrical socket means receiving said pin to provide sweep in a vertical plane; said block being split from its socket to a vertical edge; a lateral edge of said block being beveled on a vertical plane at a small acute angle with respect to the lateral edge; a sweep control handle threadably engaged with said bracket at said same small acute angle with respect to the bracket and having its inner end directly abutting the beveled block edge, whereby tightening of said handle axially and rotatably binds said block, pin, and bracket into a tightly interlocked engagement; said vertical panoramic bracket having a pair of upstanding ears; a camera bed including a leg extending between said ears; aligned transverse openings in said ears and leg; the opening in one ear being threaded; the space dimension between said ears being greater than the dimension of said leg to provide a clearance therebetween; a spacer locking element in said clearance, having an orifice aligned with said openings, and having edge portions engaging said bracket means to prevent rotation of the element; locking stud means extending through said openings and orifice with one end engaged in said threaded opening; said leg being pivotal on said stud to provide a tilting camera bed; and said stud means including a shoulder adapted to engage and bind said spacer, leg and one of said ears into a tightly locked non-rotational engagement when said stud is tightened.

References Cited in the file of this patent
UNITED STATES PATENTS
2,374,021 Korling _____ Apr. 17, 1945
FOREIGN PATENTS
1,052,966 France _____ Jan. 29, 1954